US010158921B2

(12) United States Patent
Tam

(10) Patent No.: US 10,158,921 B2
(45) Date of Patent: Dec. 18, 2018

(54) IM CLIENT AND METHOD PERFORMED THEREBY FOR PROVIDING A SUBSCRIBER OF AN IPTV SERVICE PROVIDER WITH INFORMATION

(71) Applicant: TELEFONAKTIEBOLAGET L M ERICSSON (PUBL), Stockholm (SE)

(72) Inventor: Edwin Tam, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 230 days.

(21) Appl. No.: 14/902,213

(22) PCT Filed: Jul. 3, 2013

(86) PCT No.: PCT/CN2013/078725
§ 371 (c)(1),
(2) Date: Dec. 30, 2015

(87) PCT Pub. No.: WO2015/000145
PCT Pub. Date: Jan. 8, 2015

(65) Prior Publication Data
US 2016/0156988 A1 Jun. 2, 2016

(51) Int. Cl.
*H04N 21/4788* (2011.01)
*H04N 21/488* (2011.01)
(Continued)

(52) U.S. Cl.
CPC ....... *H04N 21/4882* (2013.01); *H04L 51/046* (2013.01); *H04N 21/25883* (2013.01);
(Continued)

(58) Field of Classification Search
CPC .................................. H04N 21/4788
See application file for complete search history.

(56) References Cited

U.S. PATENT DOCUMENTS

2009/0183201 A1* 7/2009 Dasgupta ................. G09B 7/00
725/40
2010/0128103 A1* 5/2010 Sim ........................ H04N 7/147
348/14.02

(Continued)

FOREIGN PATENT DOCUMENTS

| CN | 101155045 A | 4/2008 |
| CN | 103179220 A | 6/2013 |
| EP | 2178247 A1 | 4/2010 |

OTHER PUBLICATIONS

International Search Report and Written Opinion issued in corresponding International application No. PCT/CN2013/078725, dated Apr. 3, 2014, 10 pages.

(Continued)

*Primary Examiner* — Junior O Mendoza
(74) *Attorney, Agent, or Firm* — Rothwell, Figg, Ernst & Manbeck, p.c.

(57) ABSTRACT

An IM client and a method performed by the IM client for providing a subscriber of a real-time content distributor of an IPTV service provider with information about a transmission from the real-time content distributor are provided. The IM client, the IPTV service provider and the subscriber are using an IM service. The method comprises detecting (110) a start, or imminent start of the transmission; and determining (130) whether the subscriber is comprised in a friend list of the real-time content distributor. The method further comprises, if the subscriber is comprised in a friend list of the real-time content distributor, notifying (140) the subscriber about the start, or imminent start, of the transmission.

16 Claims, 11 Drawing Sheets

(51) Int. Cl.
*H04L 12/58* (2006.01)
*H04N 21/258* (2011.01)
*H04N 21/262* (2011.01)
*H04N 21/482* (2011.01)
*H04N 21/643* (2011.01)

(52) U.S. Cl.
CPC ... *H04N 21/26291* (2013.01); *H04N 21/4788* (2013.01); *H04N 21/4821* (2013.01); *H04N 21/64322* (2013.01)

(56) References Cited

U.S. PATENT DOCUMENTS

| | | | | |
|---|---|---|---|---|
| 2013/0347046 | A1* | 12/2013 | Bluvband | G06F 3/005 |
| | | | | 725/109 |
| 2014/0013367 | A1* | 1/2014 | Elhag | H04N 21/2665 |
| | | | | 725/95 |
| 2016/0171291 | A1* | 6/2016 | Papakipos | G06F 17/30247 |
| | | | | 382/118 |

OTHER PUBLICATIONS

International Preliminary Report on Patentability issued in corresponding International application No. PCT/CN2013/078725, dated Nov. 2, 2015, 6 pages.

\* cited by examiner

|  | KittyKitchen@im.org | Wondercam@xyz.com | 22365546@nicovid.jp |
|---|---|---|---|
| Carl | Friend | Friend |  |
| Solo | Friend |  | Friend |
| Johan |  | Friend |  |
| Tom | Friend |  |  |

Fig. 2b

IM CLIENT AND METHOD PERFORMED THEREBY FOR PROVIDING A SUBSCRIBER OF AN IPTV SERVICE PROVIDER WITH INFORMATION

CROSS REFERENCE TO RELATED APPLICATION(S)

This application is a 35 U.S.C. § 371 National Phase Entry Application from PCT/CN2013/078725, filed Jul. 3, 2013, designating the United States, the disclosure of which is incorporated by reference

TECHNICAL FIELD

The present disclosure relates to Internet Protocol, IP, TV and in particular to providing a subscriber of a real-time content distributor of an Internet Protocol, IP, TV service provider with information about a transmission from the real-time content distributor.

BACKGROUND

Currently the discovery of a Live TV broadcast program relies mostly on the Electronic Program Guide, EPG, which is to be discovered and viewed by the user. The user in-turn will choose any one or the available Live broadcasts or transmissions from the EPG and tune to that specific channel. Channels that are not mentioned in the EPG are essentially inaccessible to the user, channels that could come from the Over The Top, OTT, for example, are usually not covered in the EPG, and if they need to be covered, a manual or semi-automatic method of Content Aggregation is needed to enter the relevant information into the EPG, usually done at additional cost to the IPTV Service Providers.

Having to manually aggregate and classify the OTT content adds a certain cost overhead to the IPTV operations. As live broadcasts on the Internet is usually not managed as strict as the professional TV industry, there are also possibilities of making last minute changes that may be overlooked by the IPTV service provider and thus not be able to update in time into the EPG, causing a dissatisfaction to the users.

Automatic OTT content aggregation relies on a business agreement with the content provider and often involves prior technical arrangement and case by case software development since there is no agreed standard way of updating the information to the IPTV Service Providers. All these developments add to the operating cost of the IPTV service and cause scaling problem to the service itself.

SUMMARY

The object is to obviate at least some of the problems outlined above. In particular, it is an object to provide an Instant Messaging, IM, client and a method performed by the IM client for providing a subscriber of a real-time content distributor of an IPTV service provider with information about a transmission from the real-time content distributor, wherein the IM client, the IPTV service provider and the subscriber are using an IM service These objects and others may be obtained by providing an IM client and a method performed by an IM client according to the independent claims attached below.

According to an aspect a method performed by an IM client for providing a subscriber of a real-time content distributor of an IPTV service provider with information about a transmission from the real-time content distributor is provided. The IM client, the IPTV service provider and the subscriber are using an IM service. The method comprises detecting a start, or imminent start of the transmission; and determining whether the subscriber is comprised in a friend list of the real-time content distributor. The method further comprises, if the subscriber is comprised in a friend list of the real-time content distributor, notifying the subscriber about the start, or imminent start, of the transmission.

According to an aspect, an IM client adapted for providing a subscriber of a real-time content distributor of an IPTV service provider with information about a transmission from the real-time content distributor is provided. The IM client, the IPTV service provider and the subscriber are using an IM service. The IM client comprises a detecting unit adapted for detecting a start, or imminent start of the transmission; and a determining unit adapted for determining whether the subscriber is comprised in a friend list of the real-time content distributor. The IM client further comprises a sending unit adapted for notifying the subscriber about the start, or imminent start, of the transmission if the subscriber is comprised in the friend list of the real-time content distributor.

The IM client and the method performed by the IM client may have several advantages. The method and the IM client are easy to implement in the subscriber, the real-time content distributor and the IPTV service provider. The solution (i.e. the IM client and/or the method performed by the IM client) is not vendor dependent and a plurality of different IM services may be used. The solution further allows IPTV service providers to provide quality OTT live contents as a premium service. The solution further allows subscribers to receive a status of a live event in a real-time fashion, preventing the need for constant pooling and checking which may disrupt the TV experience and increase unnecessary network traffic.

BRIEF DESCRIPTION OF DRAWINGS

Embodiments will now be described in more detail in relation to the accompanying drawings, in which:

FIG. 2b is a table of IM relationships between subscribers and real-time content distributors.

DETAILED DESCRIPTION

Briefly described, an Instant Messaging, IM, client and a method performed by the IM client for providing a subscriber of a real-time content distributor of an Internet Protocol, IP, TV service provider with information about a transmission from the real-time content distributor, the IM client, the IPTV service provider and the subscriber using an IM service are provided. By employing an IM client and IM technology, subscribers of a real-time content distributor of the IPTV service provider may be reminded or alerted when the real-time content distributor initiates a transmission.

Figure 1A:
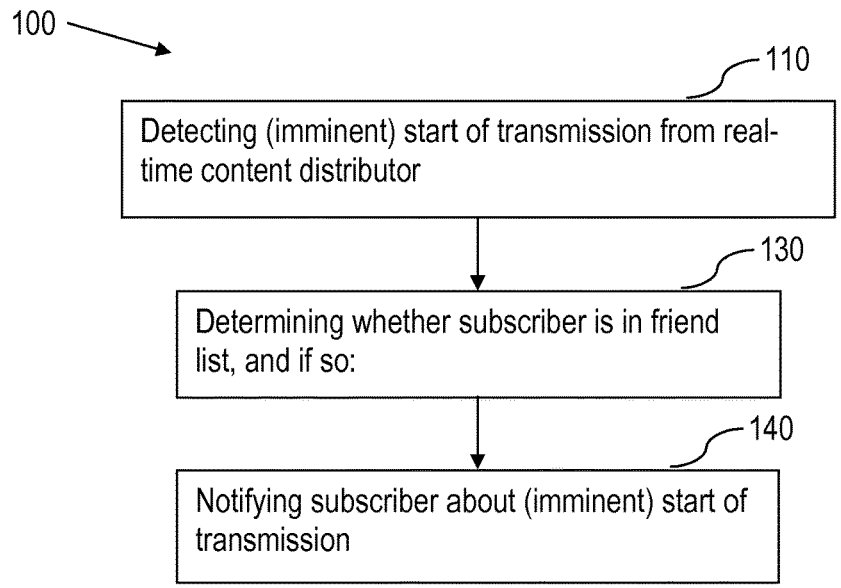
FIGS. 1a-1d are flowcharts of a method performed by an Instant Messaging, IM, client for providing a subscriber of a real-time content distributor of an Internet Protocol, IP, TV service provider with information about a transmission from the real-time content distributor according to exemplifying embodiments.

Embodiments of such a method will now be described with reference to FIG. 1a. The IPTV service provider and the subscriber are using an IM service. FIG. 1a illustrates the method comprising detecting 110 a start, or imminent start of the transmission; and determining 130 whether the subscriber is comprised in a friend list of the real-time content distributor. The method further comprises, if the subscriber is comprised in a friend list of the real-time content distributor, notifying 140 the subscriber about the start, or imminent start, of the transmission.

There may be several different real-time content distributors which may distribute content via the IPTV service provider. By applying the method as described herein these real-time content distributors may be "logically" associated with the IPTV subscribers via the friend list, which is physically managed by the IM client of the IPTV service provider. A real-time content distributor may for example be a private person choosing to start a transmission at higher own will, thus not following any official time schedule. A real-time content distributor may for example be a radio station or TV-station either following an official time schedule or not. Another example of a real-time content distributor is any entity or source transmitting Over-The-Top, OTT, live broadcast (or Internet broadcast) content by means of the IPTV service provider. In short, a real-time content distributor may be any sort of person, company or machine transmitting for example audio and/or video information by means of the Internet (and e.g. provided to subscriber by means of the IPTV service provider).

If the real-time content distributor is not following an official time schedule, e.g. transmitting between a first predefined time and a second predefined time, a subscriber of the real-time content distributor may have difficulties knowing when the real-time content distributor may start a transmission. Hence, the IM client may monitor one or more real-time content distributors and detecting a start, or imminent start of a transmission from a real-time content distributor. Once the IM client detects the start, or imminent start of the transmission from the real-time content distributor, the IM client may check a friend list of the real-time content distributor. If the IM client finds the subscriber in the friend list of the real-time content distributor, the IM client notifies the subscriber about the start, or imminent start, of the transmission. In other words, the IM client may notify all subscribers comprised in the friend list of the real-time content distributor about the start, or imminent start, of the transmission. In this manner, the subscriber, or all subscribers, of the real-time content distributor will be informed about the start, or imminent start, of the transmission and may make a decision whether to tune in to the transmission and take part of it or to skip taking part of the transmission. The subscriber need not take any actions themselves in order to monitor when the real-time content distributor may initiate a transmission. The IM client may e.g. be implemented in, incorporated in or connected to a network node of the IPTV service provider, the IM client may then be referred to as an IM client surrogate. The IM client may be implemented as a software component residing in a network node or service node of the IPTV service provider; the IM client may alternatively be implemented as an externally hosted service and connected to the IPTV service provider via the Internet or a dedicated Virtual Private Network. From hereinafter an IM client, or IM client surrogate, is to be referred to as any known IM client which is typically executed on a normal user's PC or other user device, but in addition to handling only one subscriber it handles a plurality of subscribers, or more specifically all subscribers capable of using the novel services as described herein. In addition, the suggested IM client also comprise proprietary logics for managing live broadcast signalling, detection and interworking with the IPTV service as the IM client handles all subscribers, i.e. the subscribers in the friend lists of the individual real-time content providers. The subscriber(s) may use e.g. a mobile telephone, a tablet, a personal computer, a set-top-box, a smart TV or any other device which is connectable to the Internet and comprise at least audio or video capabilities.

The method performed by the IM client may have several advantages. The method is easy to implement in the subscriber, the real-time content distributor and the IPTV service provider. The solution is not vendor dependent and a plurality of different IM services may be used. The solution further allows IPTV service providers to provide quality OTT live contents as a premium service. The solution further allows subscribers to receive a status of a live event in a real-time fashion, preventing the need for constant pooling and checking which may disrupt the TV experience and increase unnecessary network traffic.

According to an embodiment, detecting 110 the start, or imminent start, of the transmission comprises receiving an IM message indicating a change of status of the real-time content distributor.

In an IM messaging system, it is often possible for users to indicate a status, for example "idle", "unavailable", "away", "offline", "do not disturb", "active", "available", "at computer" or "online". In case the real-time content distributor changes status from e.g. "idle", "unavailable", or "offline" to "active", "available" or "online", the IM client may determine that the start or the transmission is imminent. Consequently, the IM client may notify subscribers in the friend list of the real-time content distributor about the possible imminent start of the transmission.

Detecting 110 the start, or imminent start, of the transmission may comprise detecting the start of the transmission by at least one of facial recognition, speech recognition and motion detection of a transmission received from the real-time content distributor.

The IM client may e.g. comprise software and/or hardware for one or more of facial recognition, speech recognition and motion detection. In case the IM client receives a transmission (or is already receiving the transmission), the IM client may analyse the received transmission and by means of one or more of facial recognition, speech recognition and motion detection, the IM client may detect that a transmission from the real-time content distributor is about to start or has already started. In response to this detection, the IM client may notify subscribers in the friend list of the real-time content distributor about the possible start or imminent start of the transmission. Alternatively, an IM Server may comprise the software and/or hardware for one or more of facial recognition, speech recognition and motion detection. In case the IM Server receives a transmission, the IM Server may analyse the received transmission and by means of one or more of facial recognition, speech recognition and motion detection, the IM Server may detect that a transmission from the real-time content distributor is about to start or has already started. The IM Server may then notify the IM client that a change of status has occurred, e.g. from "idle", "unavailable", or "offline" to "active", "available" or "online". In this manner, the IM client detects the start, or imminent start, of the transmission so that the IM client may check the friend list of the real-time content distributor in order to notify the subscribers in the friend list that the transmission has started or a start of the transmission is imminent.

According to still an embodiment, the method further comprises receiving 120 a status message comprising program information from the real-time content distributor, wherein notifying 140 the subscriber about the start, or imminent start, of the transmission further comprises providing the subscriber with the received program information.

The status message received by the IM client from the real-time content distributor indicates the status of the real-time content distributor as described above. The status message may further comprise program information regarding the transmission which is about to start or is starting. If the status message comprises program information, the IM client provides the subscriber with the received program information. The program information may e.g. briefly describe the transmission that the real-time content distributor transmit or is transmitting.

According to yet an embodiment, the real-time content distributor is an Over-The-Top, OTT, broadcaster providing Internet live transmission.

OTT is a general term for a service that you utilise over a network that is not offered by that network operator. It's often referred to as "over-the-top" because these services ride on top of the service a subscriber already gets and don't require any business or technology affiliations with the subscriber's network operator.

Figure 1B:
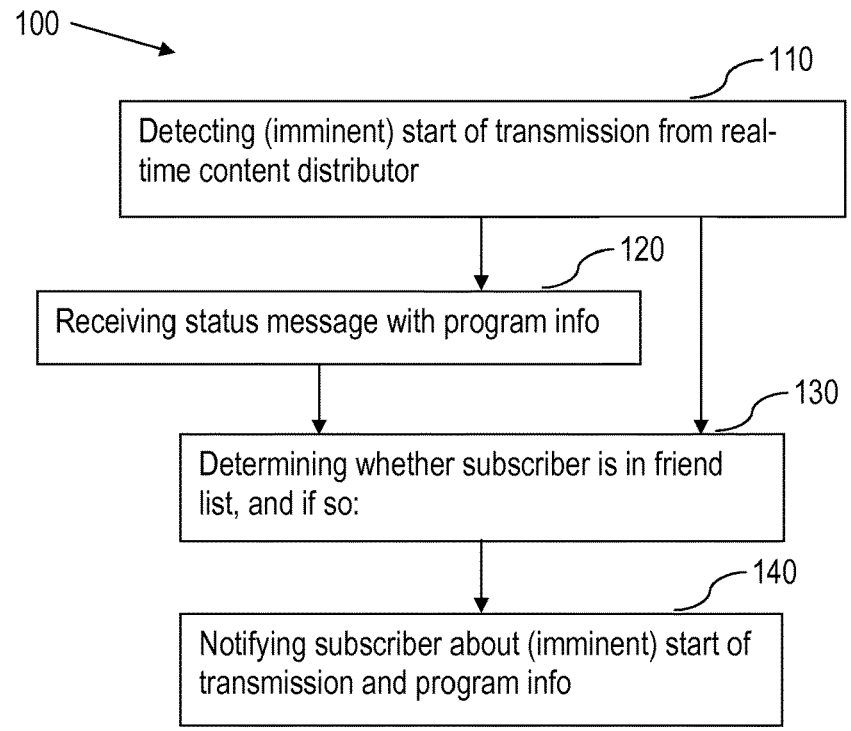
Figure 1C:
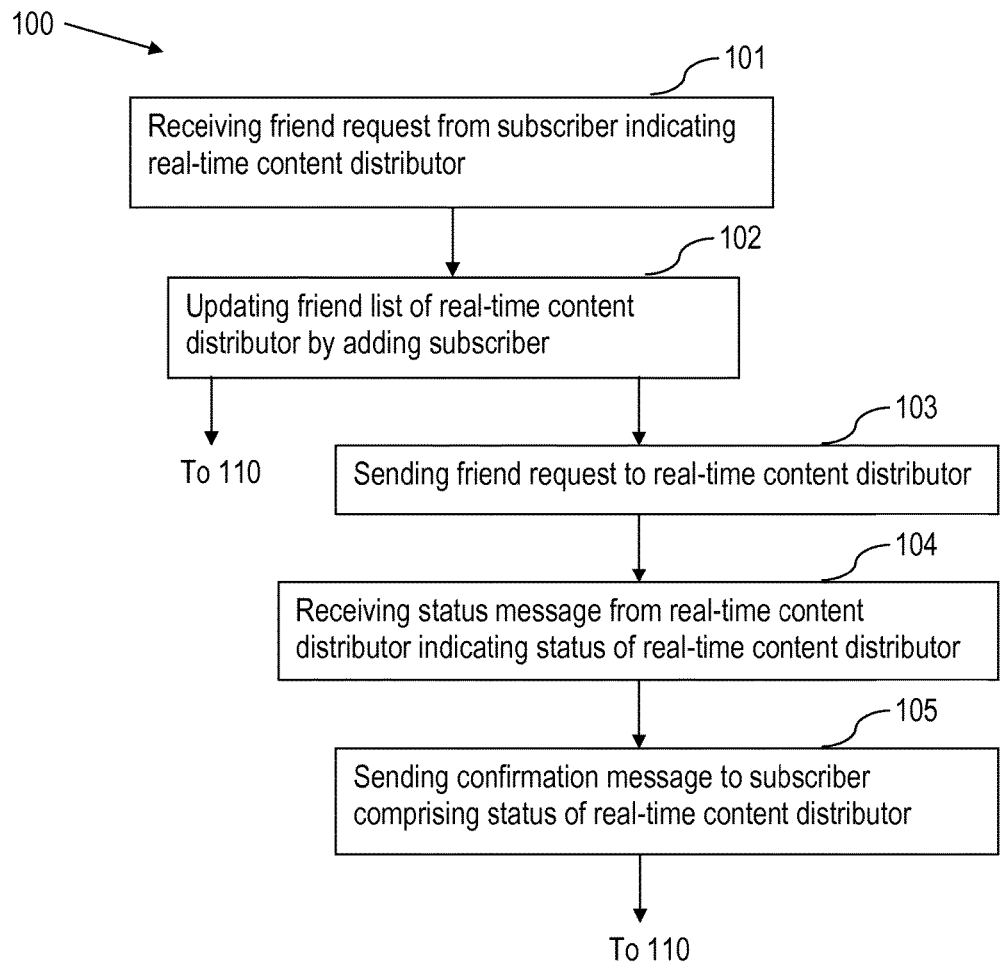

According to an embodiment, illustrated in FIG. 1*c*, the method further comprises receiving 101 a friend request, via the IM service, from the subscriber, the friend request indicating the real-time content distributor; and updating 102 the friend list of the real-time content distributor by adding the subscriber to the friend list of the real-time content distributor.

Before a subscriber may be on the friend list of the real-time content distributor, the subscriber must first indicate that it wants to be added to the friend list of the real-time content distributor. In order to be added, the subscriber sends a friend request to the IM client, the friend request indicating both the subscriber and the real-time content distributor. The IM client receives this friend request and updates the friend list of the real-time content distributor accordingly by adding the subscriber to the friend list of real-time content distributor.

According to an embodiment, the method further comprises sending 103 the received friend request to the real-time content distributor; and receiving 104 an IM status message from the real-time content distributor indicating the status of the real-time content distributor. The method further comprises sending 105 a confirmation message to the subscriber, the confirmation message indicating to the subscriber that the subscriber has been added to the friend list of the real-time content distributor and the status of the real-time content distributor.

When the IM client receives the friend request indicating both the subscriber and the real-time content distributor from the subscriber, the IM client may update the friends list of the real-time content distributor as described above. The IM client may also send the received friend request to the real-time content distributor.

The real-time content distributor may then e.g. respond with a rejection, whereby the IM client will either refrain from adding the subscriber to the friend list or remove the subscriber from the friend list tithe subscriber is already in the friend list. The real-time content distributor may alternatively respond by sending its status information, e.g. in an IM status message, back to the IM client. When the IM client receives the IM status message from the real-time content distributor indicating the status of the real-time content distributor, the IM client may confirm to the subscriber that the subscriber was successfully added to the friend list. This may be done by the IM client sending the confirmation message to the subscriber. The confirmation message may further comprise the status of the real-time content distributor as this information was received by the IM client and is of interest to the subscriber since the subscriber wishes to be on the friend list of the real-time content distributor.

Figure 1D:
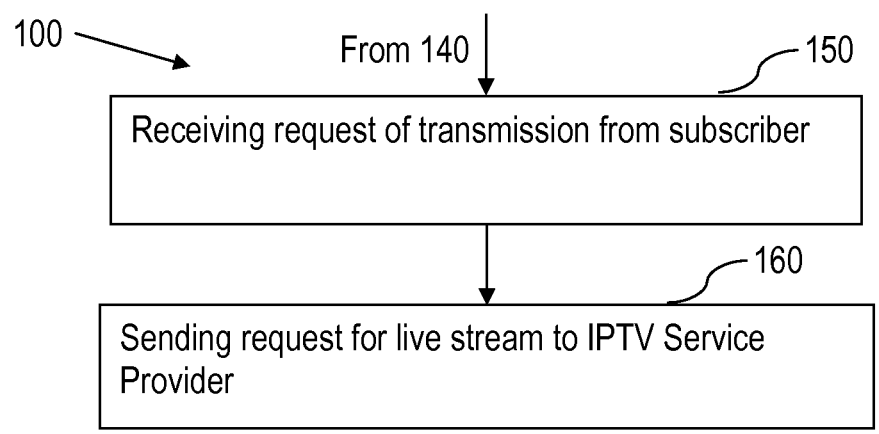

According to an embodiment, illustrated in FIG. 1*d*, the method further comprises receiving 150 a request from the subscriber for the transmission; and sending 160 a request for live stream to the IPTV service provider.

When the subscriber has been informed about the start or imminent start of the transmission, i.e. when the subscriber receives the notification of the start, or imminent start, of the transmission from the IM client, see action 140 in FIG. 1*a*, the subscriber is enabled to choose between watching or listening to the transmission or no to watching or listening to the transmission. In case the subscriber wants to partake of the transmission, e.g. watching or listening to the transmission, the subscriber requests, from the IM client, to receive the transmission. This may be done by the subscriber sending the request for the transmission which is received by the IM client in action 150 of FIG. 1*d*. In response to receiving the request, the IM client in turn sends 160 or forwards the requests for the live stream to the IPTV service provider. The IPTV service provider may then send a request for live stream to the real-time content distributor. The real-time content distributor transmits the live stream to the IPTV service provider and the IPTV service provider receives the live stream and directly forwards the live stream to the subscriber. In this manner, the IM Client invokes the existing mechanism in the IPTV service to receive and forward the live stream to the subscriber The IM client may also update an Electronic Program Guide, EPG, with the start, or imminent start of the transmission.

The EPG generally comprise information about scheduled transmissions or programs and may comprise information about scheduled transmissions or programs several days ahead. It may further be possible for a subscriber to subscribe to the EPG and hence receive notifications every time there is a change, or update, to the EPG. Ely updating the EPG at least with information about the start, or imminent start of the transmission, a subscriber to the EPG may be notified about the start, or imminent start of the transmission. Further, the IM client may also update the EPG with program information, which may be received in the IM Status message as described above.

Figure 2A:
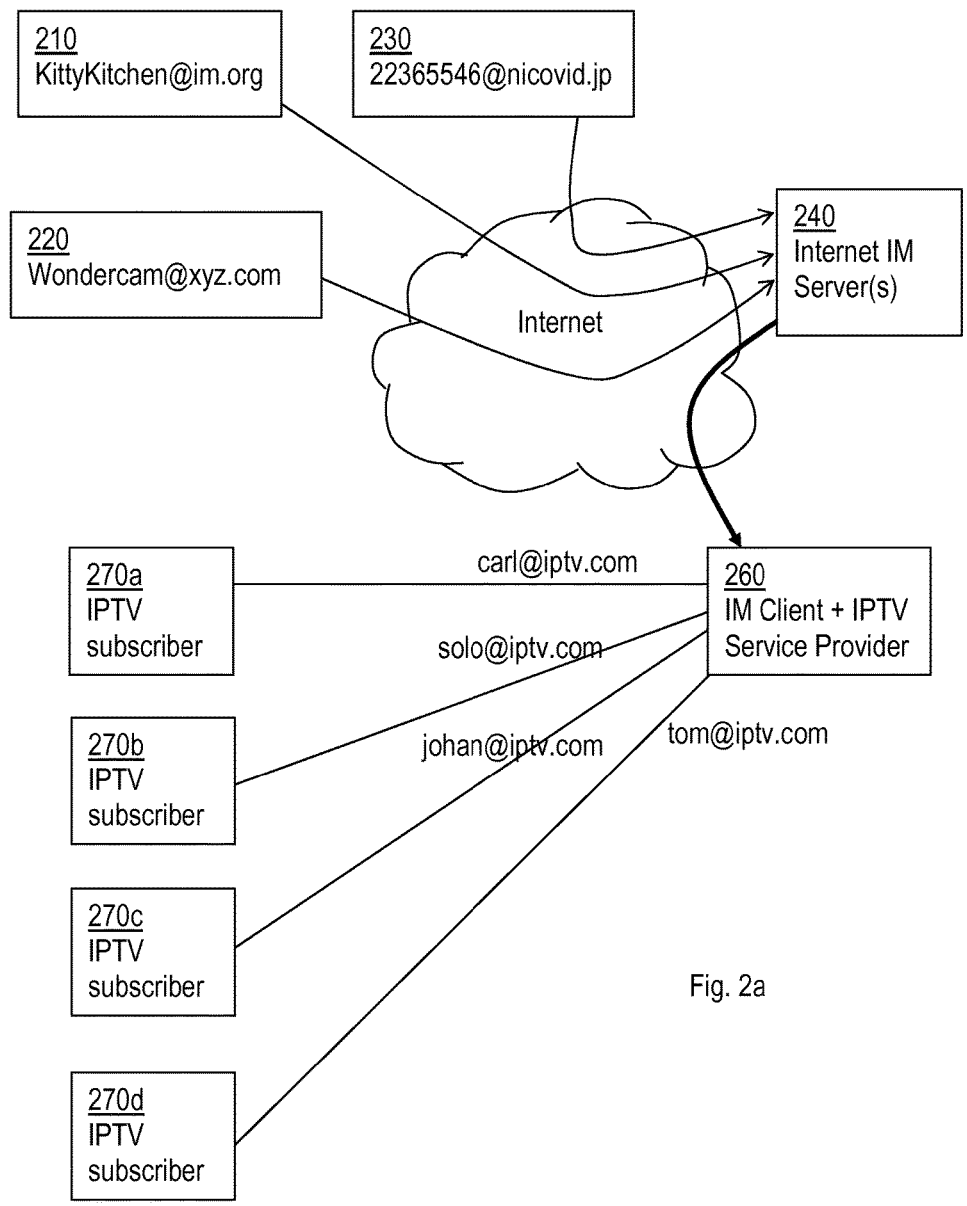
FIG. 2a is an illustration of an IPTV structure employing IM technology for providing a subscriber of a real-time content distributor of an Internet Protocol, IP, TV service provider with information about a transmission from the real-time content distributor according to an exemplifying embodiment.

FIG. 2a is an illustration of an IPTV structure employing IM technology for providing a subscriber 270a-270d of a real-time content distributor of an Internet Protocol, IP, TV service provider with information about a transmission from the real-time content distributor 210, 220, 230 according to an exemplifying embodiment. In FIG. 2a, three different real-time content distributors 210, 220, 230 are offering their content on the Internet. Each of them has their own IM contact address published somewhere on the Internet: kittykitchen@im.org 210, wondercam@xyz.com 220, and 22365546@nicovid.jp 230.

Four subscribers subscribed to the IPTV service above also has their IM service subscribed to some of the real-time content distributors above: carl@iptv.com has added wondercam@xyz.com and kittykitchen@im.org as "friends"; solo@iptv.com has added kittykitchen@im.org and 22365546@nicovid.jp as friends; likewise for johan@itpv.com and tom@iptv.com who has added wondercam@xyz.com as friend and kittykitchen@im.org as friend respectively. See also table in FIG. 2b.

If, for example, when KittyKitchen 210 decides to start a Live Broadcast, KittyKitchen will need to change the status of the IM account kittykitchen@im.org from Idle/Away to Active/Available, the public IM server 240 that is providing the real-time content distributors' IM service would signal all the friends' IM clients this change of status, including the IPTV service provider's IM Client. It shall be pointed out that in this example, the IM client is incorporated into the IPTV service provider. The IPTV service provider and the IM client are illustrated by box 260. In this example, the IPTV Service on behalf of Carl, Solo and Tom will be signalled for this change that the broadcast is about to start. The IPTV Service backend can obtain further information about the program details from the OTT Source's IM status message or IM account profile. Depending on further logic to determine if the user should receive notification of this broadcast event, the IPTV Service will notify the TV Clients of Carl, Solo or Tom that a live broadcast is now available for watching. It shall be pointed out that there may be one or more IP Servers located in, or connected to, the Internet.

Meanwhile, Carl, Solo and Tom will be presented with a message on e.g. their TV screen telling them that the broadcast from KittyKitchen is about to start. Again it shall be pointed out that the subscribers may use several different devices in order to partake in the transmission from the real-time content distributors, e.g. mobile phone, smart phone, laptop, tablets and personal computers just to mention a few. Any one of them can react to this message by either tune to this channel or remove it from the screen. By tuning to the channel is meant the above described requesting the live stream from the IM client.

Further to control the privacy, should Carl, Solo or Tom have his own IM status set to Do Not Disturb, the message about the broadcast is available will not appear on the TV screen or in any other way be displayed to them.

Figure 2C:
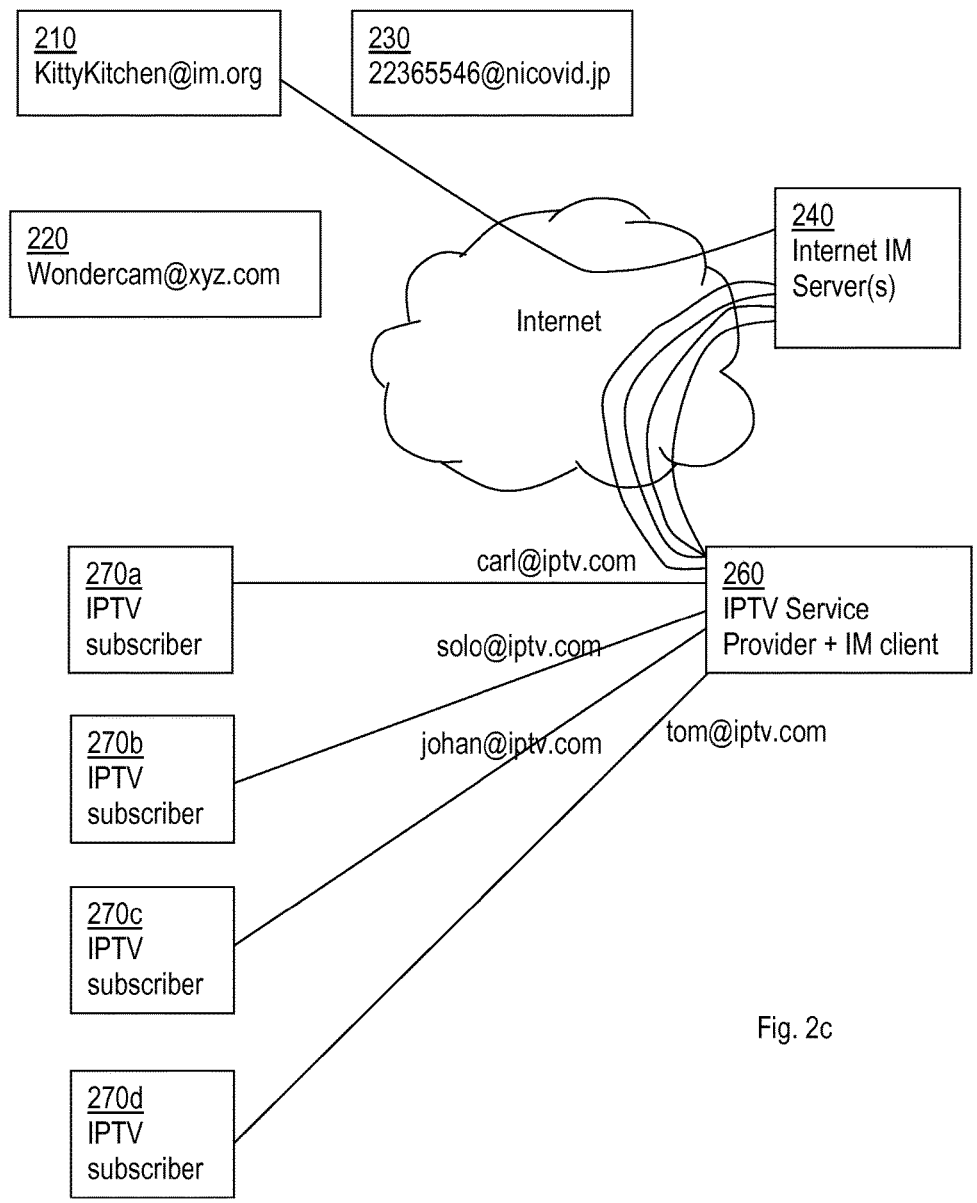
FIG. 2c is an illustration of an IPTV structure employing IM technology for providing a subscriber of a real-time content distributor of an IPTV service provider with information about a transmission from the real-time content distributor according to an exemplifying embodiment.

FIG. 2c is an illustration of an IPTV structure employing IM technology for providing a subscriber of a real-time content distributor of an IPTV service provider with information about a transmission from the real-time content distributor according to an exemplifying embodiment. In this example, the IM client is requested to send (or forward) requests for live streams to the IPTV service provider so that the IPTV service provider may request live streams from the respective real-time content distributors.

Each of the OTT Sources on the Internet should own an IM account using a certain pre-existing IM service such as e.g. ICQ, Windows Live Messenger, Jabber, etc. The IPTV Service provided by the Service Provider has a function to become the IM client to their subscribers (Users). Upon the Users' requests, the IM client will proceed to add one or more of the OTT Sources' IM accounts to the "Friend" list. The IM client may then be able to respond to any change of those IM accounts in the "Friend" list and take further action depending on the nature of the changes.

When the OTT Source decides to start a live broadcast, the OTT Source will need to change the status on its IM account, for example, from Away to become Available. This change of status will be automatically updated to the IPTV Service Provider's IM client. This is a default behaviour of the Internet based IM service. The IPTV Service Provider will further process this updated status, such as to display related information to the Users about the availability of this particular transmission or broadcast so that those Users can decide if they want to tune to this broadcast channel or not.

IM status changes can also be triggered automatically. Information obtained from facial recognition software, speech recognition software and motion detection software can give reliable details to a proprietary software to determine if the broadcast has been started. The IM account status can beset according to the output of the proprietary software. This proprietary software may reside on either the OTT Source or on the Service Provider. In case of Service Provider, it can be used to monitor and adjust the IM account status on the IM client when necessary, independent of the OTT Source's IM status.

Information about the broadcast may also be updated via the same IM service. Details about the broadcast such as names and nature of the content can be embedded into the IM User Profile, or simply as a customised status message which is a common feature to almost all IM services on the Internet.

Figure 3A:
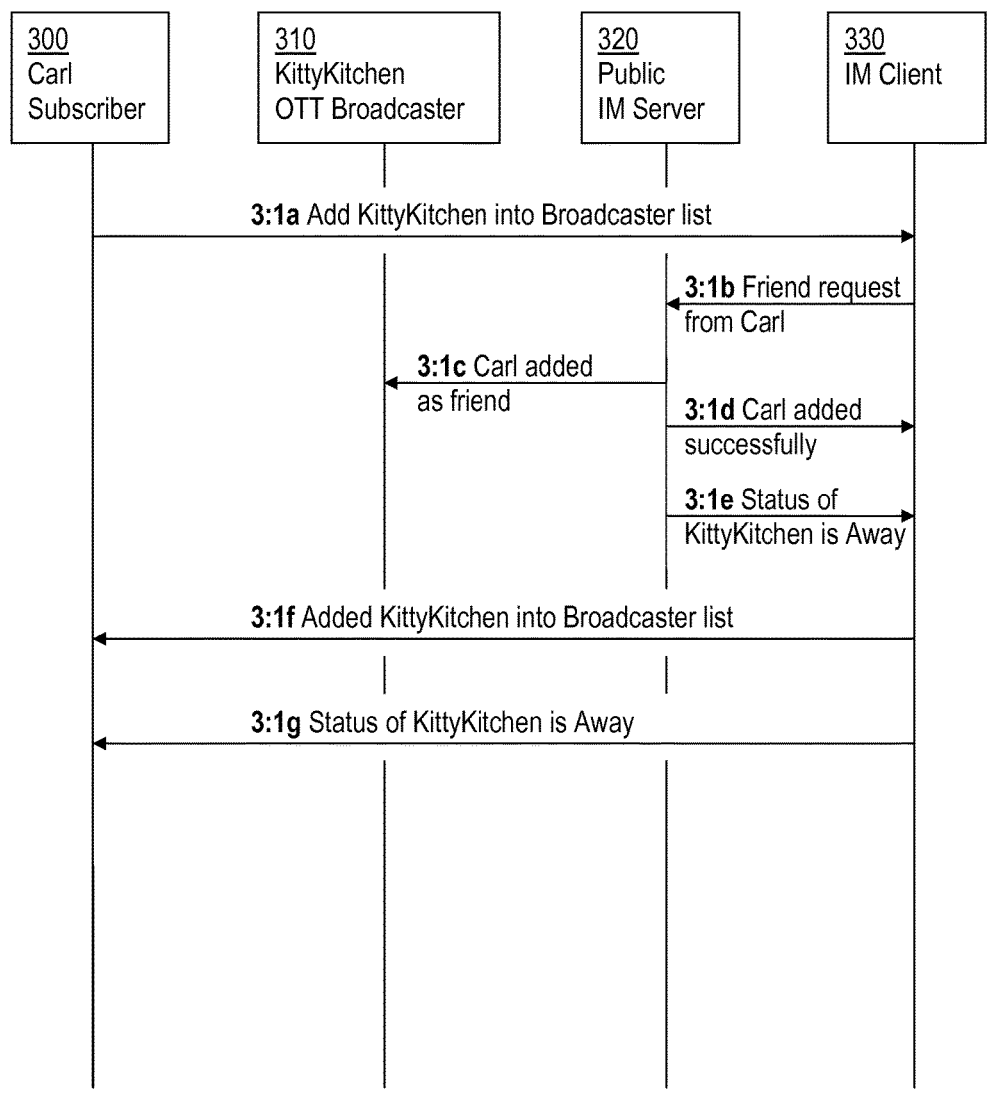
FIGS. 3a-3c are signalling diagrams illustrating examples of execution of a method performed by an IM client for providing a subscriber of a real-time content distributor of an IPTV service provider with information about a transmission from the real-time content distributor.
Figure 3B:
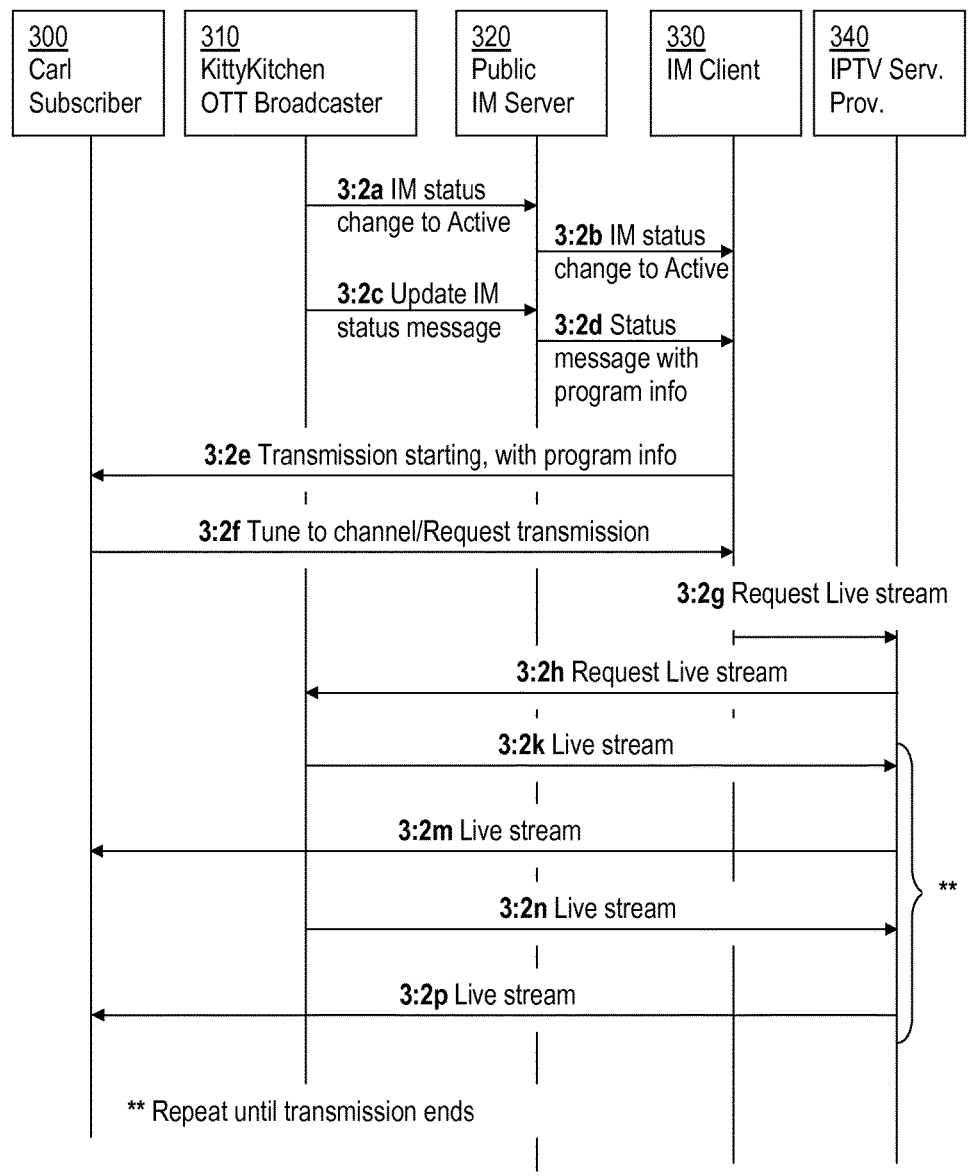
Figure 3C:
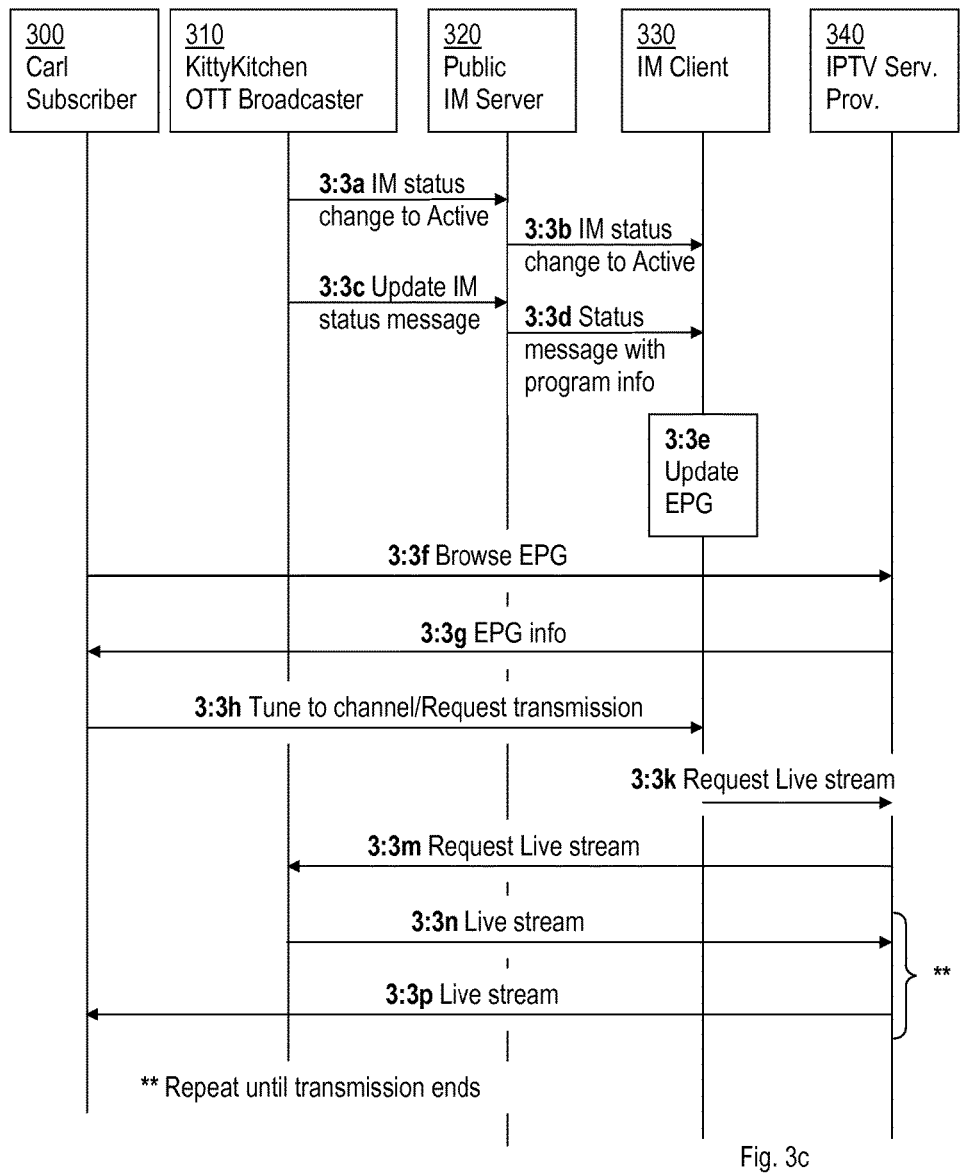

FIGS. 3a-3c are signalling diagrams illustrating examples or execution of a method performed by an IM client for providing a subscriber of a real-time content distributor of an IPTV service provider with information about a transmission from the real-time content distributor.

FIG. 3a is a signalling diagram of an example of a subscriber requesting to be added to a friend list of a real-time content distributor (in this example an OTT Broadcaster).

FIG. 3a illustrates the subscriber Carl 300 sending 3:1a a request to the IM client 330 to be added into the Friend list of KittyKitchen, or in other words, the subscriber Carl informs the IM Client that he want to receive transmissions (e.g. broadcasts) of KittyKitchen. The IM client 330 sends all) a friend request to a public IM Server 320, which in turn informs 3:1c the real-time content distributor 310, i.e. KittyKitchen, that Carl has been added to the friend list. The public IM client 330 also confirms 3:1d that Carl 300 has been added to the friend list of Kitty Kitchen 310. The public IM 320 server also sends 3:1e the status of KittyKitchen to the IM Client 330, in this example, KittyKitchen 310 is away. The IM client 330 also confirms 3:1f, to the subscriber Carl 300, that he has been successfully added into the Broadcaster list and then provides 3:1g the status of the Broadcaster, i.e. KittyKitchen, to Carl 310.

FIG. 3b illustrates an example when a real-time content distributor (in this example the OTT Broadcaster KittyKitchen) changes status from "idle", "unavailable", "away", "offline", "do not disturb", "active" to "available", "at computer" or "online". FIG. 3b illustrates the real-time content distributor, i.e. the OTT Broadcaster KittyKitchen 310, changing status to "Active" and sends a 3:2a a status change message, e.g. an IM Status change to Active message, to the public IM server 320, which in turn forwards 3:2b the message to the IM client 330. KittyKitchen 310 also sends 3:2c program information, e.g. by sending an Update IM status message, to the public IM server 320, which in turn forwards 3:2d the message to the IM client 330. By receiving the IM status change to Active message from the public IM server 320, the IM client 330 is enabled to deduce that a start of a transmission may be imminent and informs 3:2e the subscribers in the friends list of KittyKitchen about the possible start or imminent start of the transmission. The IM client 330 may also include the program information it received in message 3:2d into the message 3:2e informing Carl 300 about the possible start or imminent start of the transmission, optionally with program information is such information was received in message 3:2d.

Then Carl may tune 3:2f to the channel, e.g. by sending a request for the transmission to the IM client 330. The IM client 330 then knows that Carl 300 wants to receive the transmission from KittyKitchen 310 and hence sends, or forwards, 3:2g the request for live stream to the IPTV service provider 340, which in turn sends 3:2h the request for live stream to KittyKitchen 310. KittyKitchen 130 then sends 3:2k, 3:2n live streams to the IPTV service provider 340 which the IPTV service provider 340 forwards 3:2m, 3:2p to Carl 300. KittyKitchen 310 may send live streams until he/she ends his/her transmission.

FIG. 3c illustrates yet an example when a real-time content distributor (in this example the OTT Broadcaster KittyKitchen) changes status from "idle", "unavailable", "away", "offline", "do not disturb", to "active", "available", "at computer" or "online". As in the previous figure, the OTT Broadcaster KittyKitchen 310, changing status to "Active" and sends 3:3a a status change message, e.g. an IM Status change to Active message, to the public IM server 320, which in turn forwards 3:3b the message to the IM client 330. KittyKitchen 310 also sends 3:3c program information, e.g. by sending an Update IM status message, to the public IM server 320, which in turn forwards 3:3d the message to the IM client 330. The IM client in this example updates 3:3e an EPG with the received information about KittyKitchen 310 having changed status and with the received program information. The subscriber Carl 300 may then browse 3:3f the EPG and receive 3:3g EPG information. Optionally, the EPG may send a notification to Carl 300 just as the EPG has been updated (not shown).

Once Carl 300 has obtained the information about the start or imminent start of the transmission, Carl 300 may tune 3:3h to the channel, e.g. by sending a request for the transmission to the IPTV service provider 340. The IPTV service provider 340 then knows that Carl 300 wants to receive the transmission from KittyKitchen 310 and hence sends 3:3k a request for live stream to the IPTV service provider 340. The IPTV service provider then sends 3:3m the request for live stream to KittyKitchen 130 when then sends 3:3n live streams to the IPTV service provider 340 which the IPTV service provider 340 forwards 3:3p to Carl 300. KittyKitchen 310 may send live streams until he/she ends his/her transmission.

It shall be pointed out that the IM client 330 may be incorporated into the IPTV service provider. The IM client may be implemented as a software component residing in a network node or service node of the IPTV service provider; the IM client may alternatively be implemented as an externally hosted service and connected to the IPTV service provider via the Internet or a dedicated Virtual Private Network.

Embodiments herein also relate to an IM client adapted for providing a subscriber of a real-time content distributor of an IPTV service provider with information about a transmission from the real-time content distributor, the IM client, the IPTV service provider and the subscriber using an IM service. The IM client has the same technical feature, objects and advantages as the method performed by the IM client. The IM client will only be described in brief in order to avoid unnecessary repetition.

Figure 4:
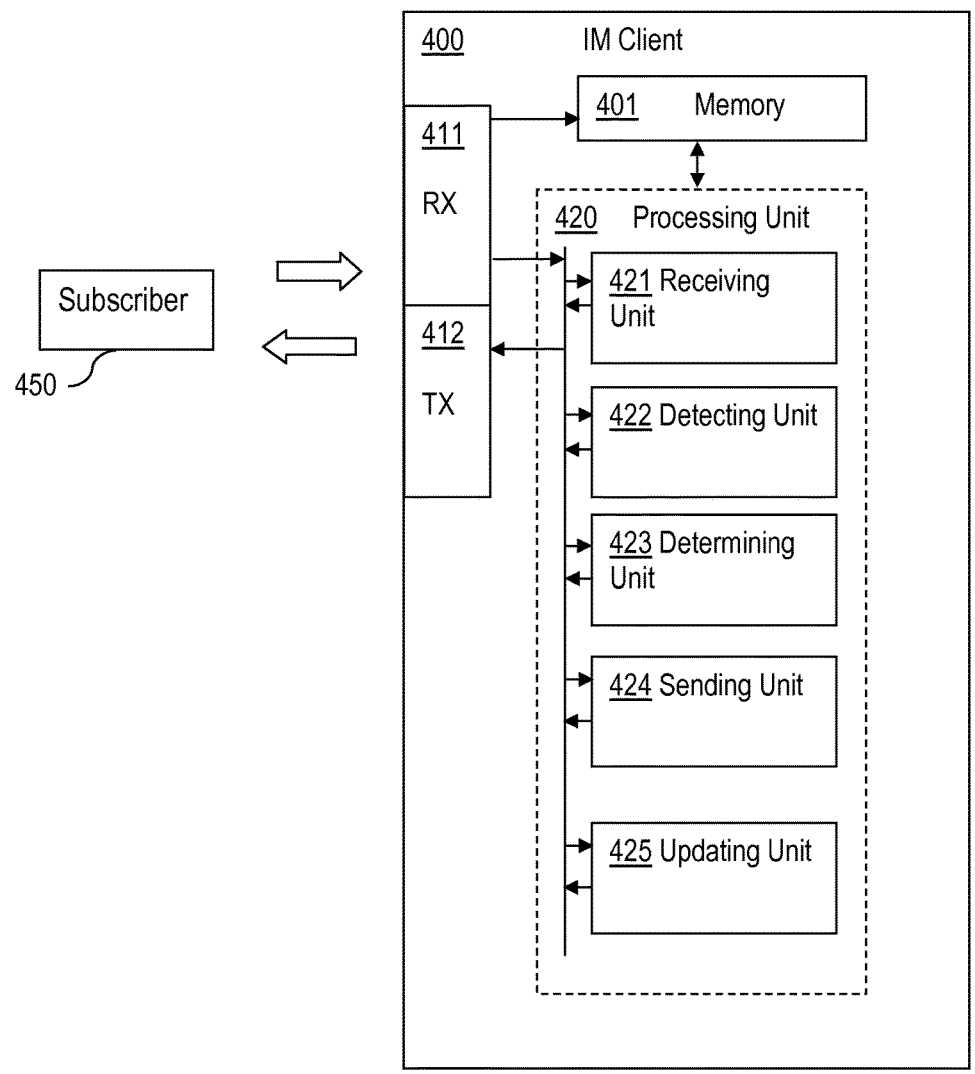
FIG. 4 is a block diagram of an IM client adapted for providing a subscriber of a real-time content distributor of an IPTV service provider with information about a transmission from the real-time content distributor according to an exemplifying embodiment.

FIG. 4 is a block diagram of an IM client adapted for providing a subscriber of a real-time content distributor of an IPTV service provide with information about a transmission from the real-time content distributor according to an exemplifying embodiment.

FIG. 4 illustrates the IM client comprising a detecting unit 422 adapted for detecting a start, or imminent start of the transmission; and a determining unit 423 adapted for determining whether the subscriber is comprised in a friend list of the real-time content distributor. The IM client further comprises a sending unit 424 adapted for notifying the subscriber about the start, or imminent start, of the transmission if the subscriber is comprised in the friend list of the real-time content distributor.

The IM client may have the same possible advantages as the method performed by the IM client. The solution (the IM client adapted to perform the method) is implemented in the subscriber, the real-time content distributor and the IPTV service provider. The solution is not vendor dependent and a plurality of different IM services may be used. The solution further allows IPTV service providers to provide quality OTT live contents as a premium service. The solution further allows subscribers to receive a status of a live event in a real-time fashion, preventing the need for constant pooling and checking which may disrupt the TV experience and increase unnecessary network traffic.

According to an embodiment, the detecting unit 422 is adapted for detecting the start, or imminent start of the transmission by receiving an IM message indicating a change of status of the real-time content distributor.

The detecting unit 422 may further be adapted for detecting the start, or imminent start of the transmission by detecting the start of the transmission by at least one of facial recognition, speech recognition and motion detection of a transmission received from the real-time content distributor.

The IM client 400 may further comprise a receiving unit 421 adapted for receiving a status message comprising program information from the real-time content distributor, wherein the sending unit 424 is adapted for notifying the subscriber about the start, or imminent start, of the transmission further by providing the subscriber with the received program information.

The real-time content distributor may be an Over-The-Top, OTT, broadcaster providing Internet live transmission.

According to still an embodiment, the IM client 400 further comprises a receiving unit 421 adapted for receiving a friend request, via the IM service, from the subscriber, the friend request indicating the real-time content distributor; and an updating unit 425 adapted for updating the friend list of the real-time content distributor by adding the subscriber to the friend list of real-time content distributor.

According to yet an embodiment, the IM client 400 further comprises a sending unit 424 adapted for sending the received friend request to the real-time content distributor, wherein the receiving unit 421 further is adapted for receiving an IM status message from the real-time content distributor indicating the status of the real-time content distributor, and wherein the sending unit 424 is adapted for sending a confirmation message to the subscriber, the confirmation message indicating to the subscriber that the subscriber has been added to the friend list of the real-time content distributor and the status of the real-time content distributor.

The receiving unit 421 may further be adapted for receiving a request from the subscriber for the transmission, wherein the sending unit 424 is adapted for sending the request for live stream to the IPTV service provider.

The updating unit 425 may further be adapted for updating an Electronic Program Guide, EPG, with the start, or imminent start of the transmission.

In FIG. 4, the IM client 400 is also illustrated comprising a receiving arrangement 411 and a transmitting arrangement 412. Through these two arrangements, the IM client 400 is adapted to communicate with other nodes and/or entities in the wireless communication network. The receiving arrangement 411 may comprise more than one receiving arrangement. For example, the receiving unit may be connected to both a wire and an antenna, by means of which the IM client 400 is enabled to communicate with other nodes and/or entities in the communication network. Similarly, the transmitting arrangement 412 may comprise more than one transmitting arrangement, which in turn are connected to both a wire and an antenna, by means of which the IM client 400 is enabled to communicate with other nodes and/or entities in the communication network. The IM client 400 further comprises a memory 401 for storing data. Further, the IM client 400 is illustrated comprising a control or processing unit 420 which in turns is connected to (or comprises) the different units 421-425. It shall be pointed out that this is merely an illustrative example and the IM client 400 may comprise more, less or other units or modules which execute the functions of the IM client 400 in the same manner as the units illustrated in FIG. 4.

It should be noted that FIG. 4 merely illustrates various functional units in the IM client 400 in a logical sense. The functions in practice may be implemented using any suitable software and hardware means/circuits etc. Thus, the embodiments are generally not limited to the shown structures of the IM client 400 and the functional units. Hence, the previously described exemplary embodiments may be realised in many ways. For example, one embodiment includes a computer-readable medium having instructions stored thereon that are executable by the control or processing unit 420 for executing the method steps in the IM client 400. The instructions executable by the computing system and stored on the computer-readable medium perform the method steps of the IM client 400 as set forth in the claims.

Figure 5:
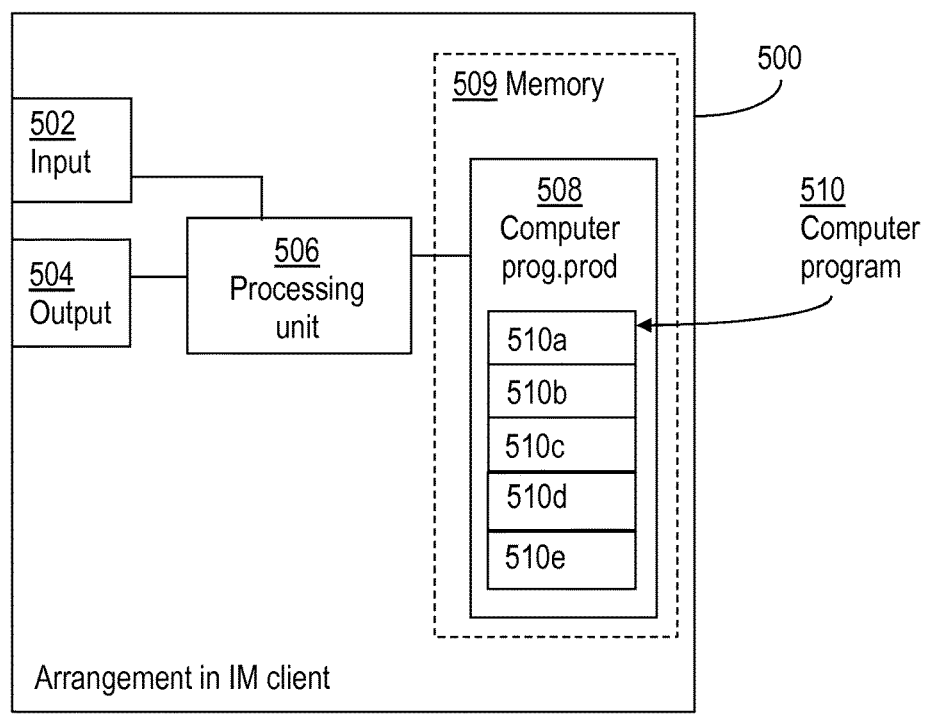
FIG. 5 is a block diagram of an arrangement in an IM client adapted for providing a subscriber of a real-time content distributor of an IPTV service provider with information about a transmission from the real-time content distributor according to an exemplifying embodiment.

FIG. 5 schematically shows an embodiment of an IM client 500. Comprised in the IM client 500 are here a processing unit 606, e.g. with a DSP (Digital Signal Processor). The processing unit 506 may be a single unit or a plurality of units to perform different actions of procedures described herein. The IM client 500 may also comprise an input unit 502 for receiving signals from other entities, and an output unit 504 for providing signal(s) to other entities. The input unit and the output unit may be arranged as an integrated entity or as illustrated in the example of FIG. 4, as one or more interfaces 411/412.

Furthermore, the IM client 500 comprises at least one computer program product 500 in the form of a non-volatile memory, e.g. an EEPROM (Electrically Erasable Programmable Read-Only Memory), a flash memory and a hard drive. The computer program product 508 comprises a computer program 510, which comprises code means, which when executed in the processing unit 506 in the IM client 500 causes the IM client 500 to perform the actions e.g. of the procedure described earlier in conjunction with FIG. 1a. The computer program product 508 may further be comprised in a memory 509.

The computer program 510 may be configured as a computer program code structured in computer program modules 510a-510e. Hence, in an exemplifying embodiment, the code means in the computer program of the IM client 500 comprises a detecting module, which corresponds to the detecting function, mentioned above with reference to FIG. 4 for detecting a start, or imminent start of the transmission. The computer program further comprises a determining module, which corresponds to the determining function, mentioned above with reference to FIG. 4, for determining whether the subscriber is comprised in a friend list of the real-time content distributor. The computer program further comprises a sending module, which corresponds to the sending function, mentioned above with reference to FIG. 4, for notifying the subscriber about the start, or imminent start, of the transmission if the subscriber is comprised in the friend list of the real-time content distributor.

The computer program modules could essentially perform the actions of the flow illustrated in FIGS. 1a-1c, to emulate the IM client 500. In other words, when the different computer program modules are executed in the processing unit 506, they may correspond to the units 421-426 of FIG. 4.

Although the code means in the embodiments disclosed above in conjunction with FIG. 4 are implemented as computer program modules which when executed in the respective processing unit causes the IM client to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM Random-access memory) ROM (Read-Only Memory) or an EEPROM, and the computer program modules described above could in alternative embodiments be distributed on different computer program products in the form of memories within the IM client.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by an Instant Messaging (IM) client for providing a subscriber of a real-time content distributor of an Internet Protocol television (IPTV) service provider with information about a transmission from the real-time content distributor, the method comprising:
receiving a friend request, via the IM service, from the subscriber, the friend request indicating the real-time content distributor;
updating the friend list of the real-time content distributor by adding the subscriber to the friend list of real-time content distributor;
sending the received friend request to the real-time content distributor;
receiving an IM status message from the real-time content distributor indicating the status of the real-time content distributor;
sending a confirmation message to the subscriber, the confirmation message indicating to the subscriber that the subscriber has been added to the friend list of the real-time content distributor and the status of the real-time content distributor;
the IM client detecting at least one of: a start and an imminent start of the transmission from the real-time content distributor, wherein the detecting comprises detecting a change of status of the real-time content distributor,
determining whether the subscriber is included in a friend list of the real-time content distributor, and
as a result of determining that the subscriber is included in said friend list, notifying the subscriber about the at least one of: the start and the imminent start of the transmission from the real-time content distributor.

2. The method of claim 1, wherein the detecting at least one of: the start and the imminent start of the transmission from the real-time content distributor further comprises receiving an IM message indicating the change of status of the real-time content distributor.

3. The method of claim 1, wherein the detecting at least one of: the start and the imminent start of the transmission from the real-time content distributor further comprises:
receiving a transmission from the real-time content distributor and processing the received transmission, wherein processing the received transmission comprises performing one or more of: facial recognition, speech recognition, and motion detection.

4. The method of claim 1, further comprising receiving a status message comprising program information from the real-time content distributor, wherein notifying the subscriber about the at least one of: the start and the imminent start of the transmission from the real-time content distributor further comprises providing the subscriber with the received program information.

5. The method of claim 1, wherein the real-time content distributor is an Over-The-Top, OTT, broadcaster providing Internet live transmission.

6. The method of claim 1, further comprising:
receiving a request from the subscriber for the transmission, and
sending a request for live stream to the IPTV service provider.

7. The method of claim 6, further comprising updating an Electronic Program Guide, EPG, with at least one of: the start and the imminent start of the transmission.

8. A computer program product comprising a non-transitory computer readable medium storing computer readable code means, which when run by a processing unit of an IM client causes the IM client to perform the method according to claim 1.

9. The method of claim 1, wherein the change of status of the real-time content distributor comprises a change from an inactive status to an active status.

10. An Instant Messaging (IM) client adapted for providing a subscriber of a real-time content distributor of an Internet Protocol television (IPTV) service provider with information about a transmission from the real-time content distributor, the IM client comprising:
a memory;
a transmitter;
a receiver; and
a processing system coupled to the memory, the processing system comprising one or more processors and being configured to:
employ the receiver to receive a friend request, via the IM service, from the subscriber, the friend request indicating the real-time content distributor,
update the friend list of the real-time content distributor by adding the subscriber to the friend list of real-time content distributor,
employ the transmitter to send the received friend request to the real-time content distributor,
employ the receiver to receive an IM status message from the real-time content distributor indicating the status of the real-time content distributor,
employ the transmitter to send a confirmation message to the subscriber, the confirmation message indicating to the subscriber that the subscriber has been added to the friend list of the real-time content distributor and the status of the real-time content distributor,
detect at least one of: a start and an imminent start of the transmission from the real-time content distributor, wherein the detecting comprises detecting a change of status of the real-time content distributor,
determine whether the subscriber is included in a friend list of the real-time content distributor, and
employ the transmitter to notify the subscriber about the at least one of: the start and the imminent start of the transmission from the real-time content distributor as a result of determining that the subscriber is included in the friend list.

11. The IM client of claim 10, wherein the processing system is adapted for detecting at least one of: the start and the imminent start of the transmission from the real-time content distributor by receiving an IM message indicating a change of status of the real-time content distributor.

12. The IM client of claim 10, wherein the processing system is adapted for detecting at least one of: the start and the imminent start of the transmission from the real-time content distributor by detecting the start of the transmission by at least one of facial recognition, speech recognition and motion detection of a transmission received from the real-time content distributor.

13. The IM client of claim 10, further comprising a receiver adapted for receiving a status message comprising program information from the real-time content distributor, wherein the processing system is adapted for notifying the subscriber about the at least one of: the start and the imminent start of the transmission from the real-time content distributor further by providing the subscriber with the received program information.

14. The IM client of claim 10, wherein the real-time content distributor is an Over-The-Top broadcaster providing Internet live transmission.

15. The IM client of claim 10, wherein the processing system is adapted for receiving a request from the subscriber for the transmission and for sending a request for live stream to the IPTV service provider.

16. The IM client of claim 10, wherein the updating unit is adapted for updating an Electronic Program Guide, EPG, with at least one of: the start and the imminent start of the transmission.

* * * * *